United States Patent [19]

Gibson

[11] Patent Number: 4,488,620

[45] Date of Patent: Dec. 18, 1984

[54] CLIMBING APPARATUS

[76] Inventor: Larry R. Gibson, Rte. 6, Box 486, Easley, S.C. 29640

[21] Appl. No.: 82,276

[22] Filed: Oct. 5, 1979

[51] Int. Cl.³ .................. A01M 31/02; A45F 3/26; A47C 9/10
[52] U.S. Cl. .................................... 182/135; 182/187
[58] Field of Search ............... 182/133, 134, 135, 136, 182/187, 188, 20

[56] References Cited

U.S. PATENT DOCUMENTS

| 857,430 | 6/1907 | Youngquist | 182/134 |
|---|---|---|---|
| 3,078,951 | 2/1963 | Schneebeli | 182/134 |
| 3,955,645 | 5/1976 | Dye | 182/135 |
| 3,960,240 | 6/1976 | Cotton | 182/20 |
| 4,129,198 | 12/1978 | Hunter | 182/187 |
| 4,137,995 | 2/1979 | Fonte | 182/136 |
| 4,148,376 | 4/1979 | Campbell | 182/187 |
| 4,150,733 | 4/1979 | Plummer | 182/187 |
| 4,230,203 | 10/1980 | Sweat | 182/187 |
| 4,236,602 | 12/1980 | Leggett | 182/187 |
| 4,244,445 | 1/1981 | Strode | 182/136 |

FOREIGN PATENT DOCUMENTS

| 368920 | 7/1906 | France | 182/188 |
|---|---|---|---|
| 1360345 | 3/1963 | France | 182/187 |

Primary Examiner—Reinaldo P. Machado

[57] ABSTRACT

A climbing apparatus for trees and the like is illustrated which employs an elongated body support member which is carried substantially horizontally with a head piece containing diverging contact pad means for engaging the tree and the like. The pad means are preferably constructed of rubbery material with Neoprene being illustrated. A standard is carried adjacent the headpiece and extends upwardly and rearwardly thereof for carrying a steel band which engages the tree, pole or similar structure to be climbed for exerting a wedging action between the pads and the tree resulting in a gripping action which will support the user.

2 Claims, 6 Drawing Figures

CLIMBING APPARATUS

BACKGROUND OF THE INVENTION

The prior art illustrates many devices for facilitating climbing but those devices generally include knives, spikes and the like which dig into the tree or pole causing damage thereto which in the case of a tree, stunts its growth or in the case of a pole, causes deterioration thereof if repeated climbing is to take place. Prior art patents include U.S. Pat. Nos. 3,955,645 and 3,960,240. The devices illustrated by these patents both include the use of knives for engaging the vertical objects to be climbed but they are relevant in that upwardly extending strap means is employed. The upper climbing apparatus which is operated by the hands illustrated in U.S. Pat. No. 3,955,645 would be useful in connection with the lower of the pair of devices forming the apparatus of the present invention.

SUMMARY OF THE INVENTION

It has been found that a body climbing device may be provided preferably utilizing devices in pairs, each of which includes a rearwardly extending body support member with rubbery pads carried by a headpiece for engaging the tree and the like. A standard extends upwardly and rearwardly from the body support member adjacent the headpiece for carrying a steel band which extends upwardly from a band carrying member positioned atop the standard. The band carrying member includes space supports with a stud passing through the band for attachment between the band engaging supports. A foot rest is carried by the upper of the pair of devices and embraces a seat forming a part of the body support devices and in this case is a swivel seat. The foot support encompasses the seat and pivotal rearwardly of the seat and provided with a stop for supporting the seat of the user when the seat is pivoted rearwardly.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
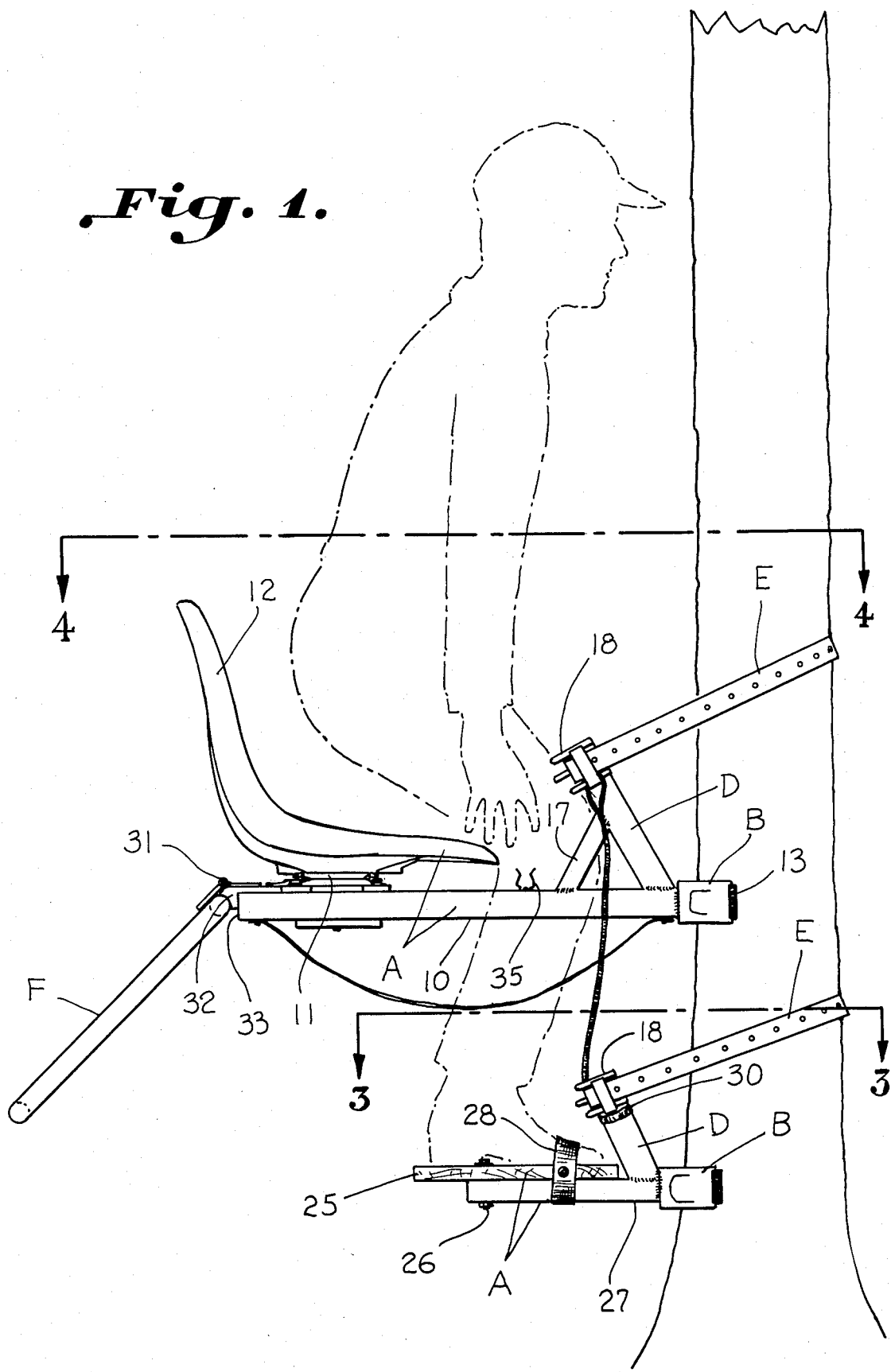
FIG. 1 is a side elevation illustrating a pair of devices constructed in accordance with the present invention being utilized to begin the ascent of a tree.

The drawings illustrate a pair of devices for climbing trees and the like each including an elongated body support member A extending laterally outwardly from a tree. A headpiece B is carried on one end of the body support member receiving the tree. Diverging contact pad means is carried within the headpiece constructed of gripping rubbery material gripping a surface of the tree received thereon. A standard D is carried by the body support member adjacent the headpiece extending upwardly therefrom outwardly from the tree. A loop member E is carried adjacent an upper end of the standard encompassing the tree. Thus, the contact pad means is wedged inwardly into engagement with the tree.

The standard extends upwardly from the body support member at an obtuse angle thereto away from the tree. The loop member E is a flat steel band carried between spaced retaining members. A foot support member F encompasses a seat provided on the body support member of a first such apparatus of the pair as set forth above. The foot support is U-shaped and is pivoted outwardly of the seat and is provided with a stop for maintaining same in a downwardly inclined foot supporting position.

In the drawings, the first or upper body support portion A includes a bar 10 which carries a suitable swivel arrangement 11 for carrying a seat portion 12 for accommodating the user which in this instance is described as being a hunter but which may be utilized by a person for any other desired use. It should be noted at this point that the lower or second of the pair of devices illustrated is useful in connection with supporting the seat and may be utilized as aforesaid with the hand piece of the U.S. Pat. No. 3,955,645.

Referring again to the upper of the pair of devices, the headpiece is illustrated in the form of a yoke employing diverging members 13 and 14 (FIG. 2) which carry a pair of spaced pads. The contact pad means C includes a pair of pads constructed preferably of neoprene illustrated at 15 and 16. Any suitable rubbery material or otherwise yieldable material for accommodating and gripping the surface of the object to be climbed and preferably deforming in accordance with the surface irregularities of the object to be climbed may be utilized. The standard D is illustrated in connection with the upper units as including a brace member 17.

Figure 2:
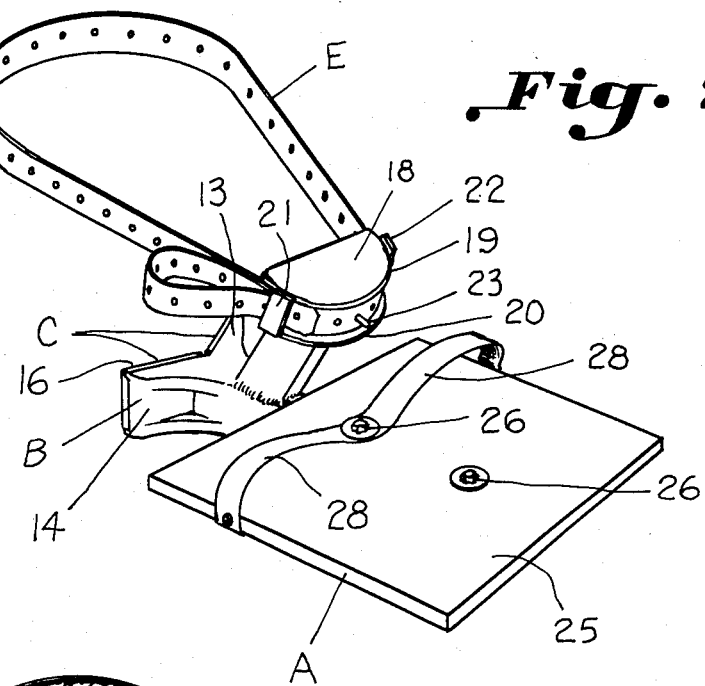
FIG. 2 is a perspective view of the lower of the devices illustrated in FIG. 1 for containing a platform forming a part of the body support means for attachment to the seat of a user.
Figure 3:
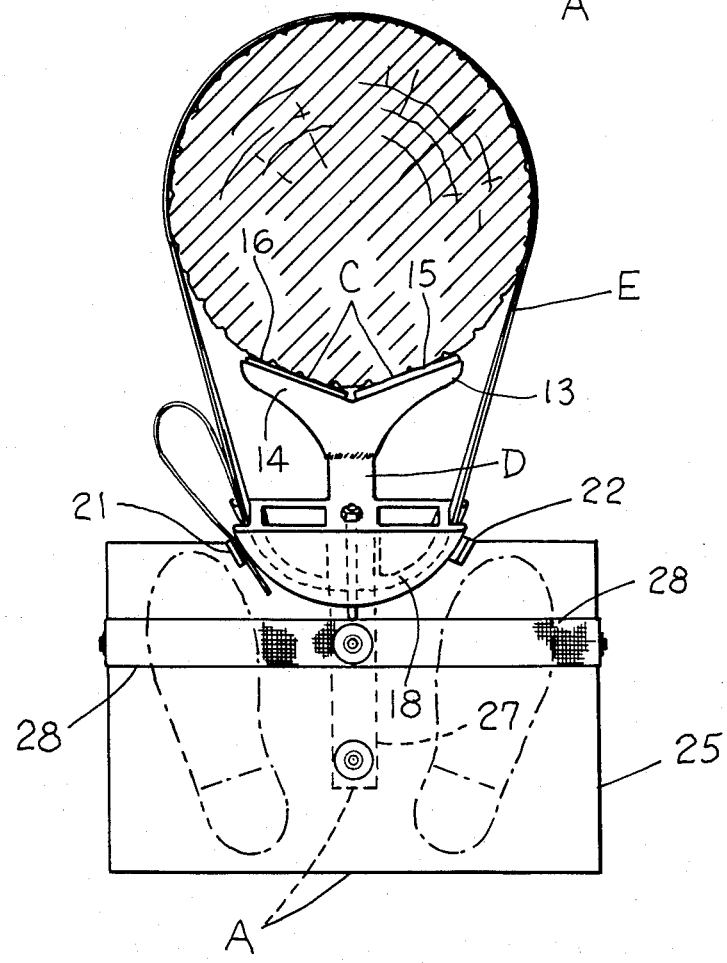
FIG. 3 is a plan view taken on the line 3—3 in FIG. 1.
Figure 4:
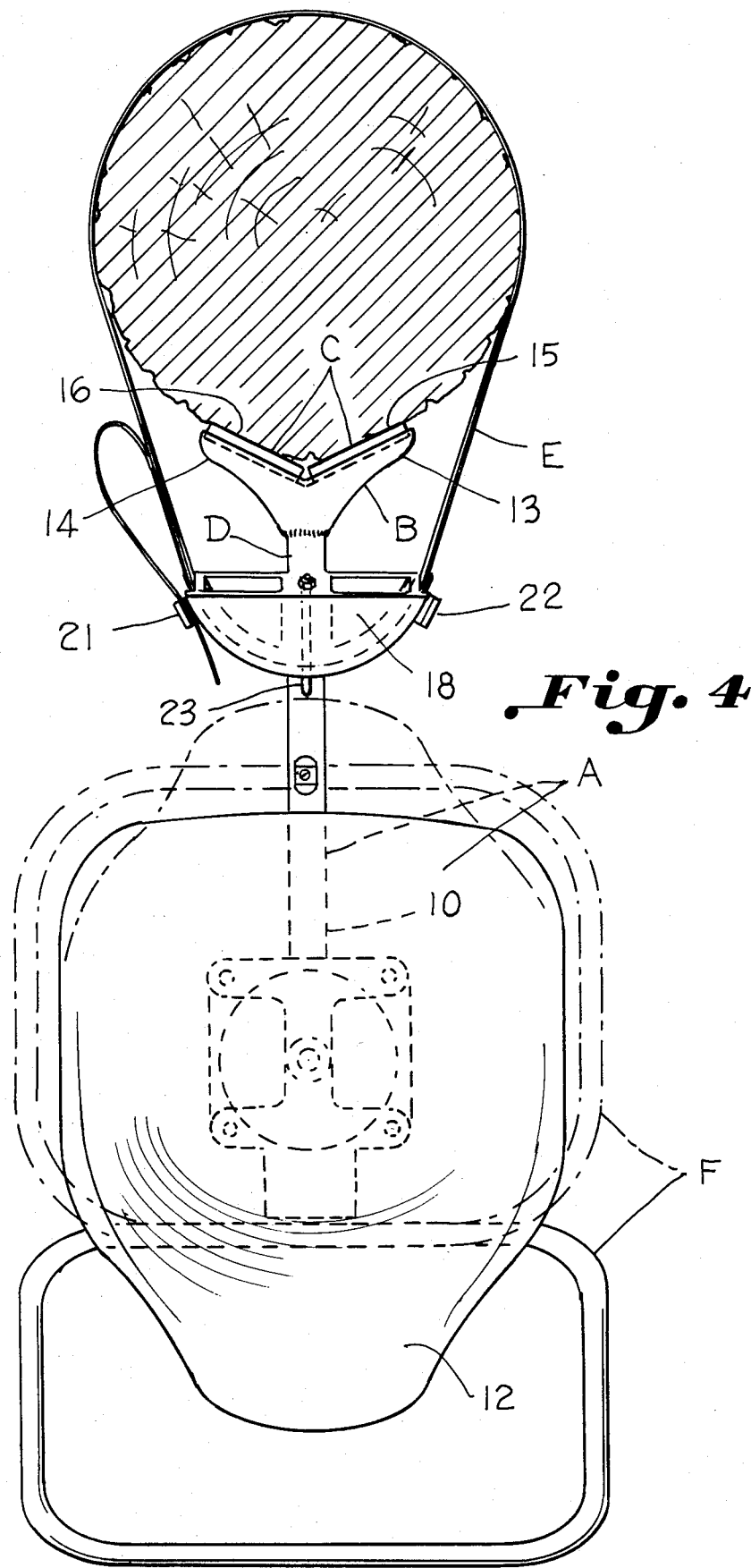
FIG. 4 is a plan view taken on the line 4—4 in FIG. 1.
Figure 5:
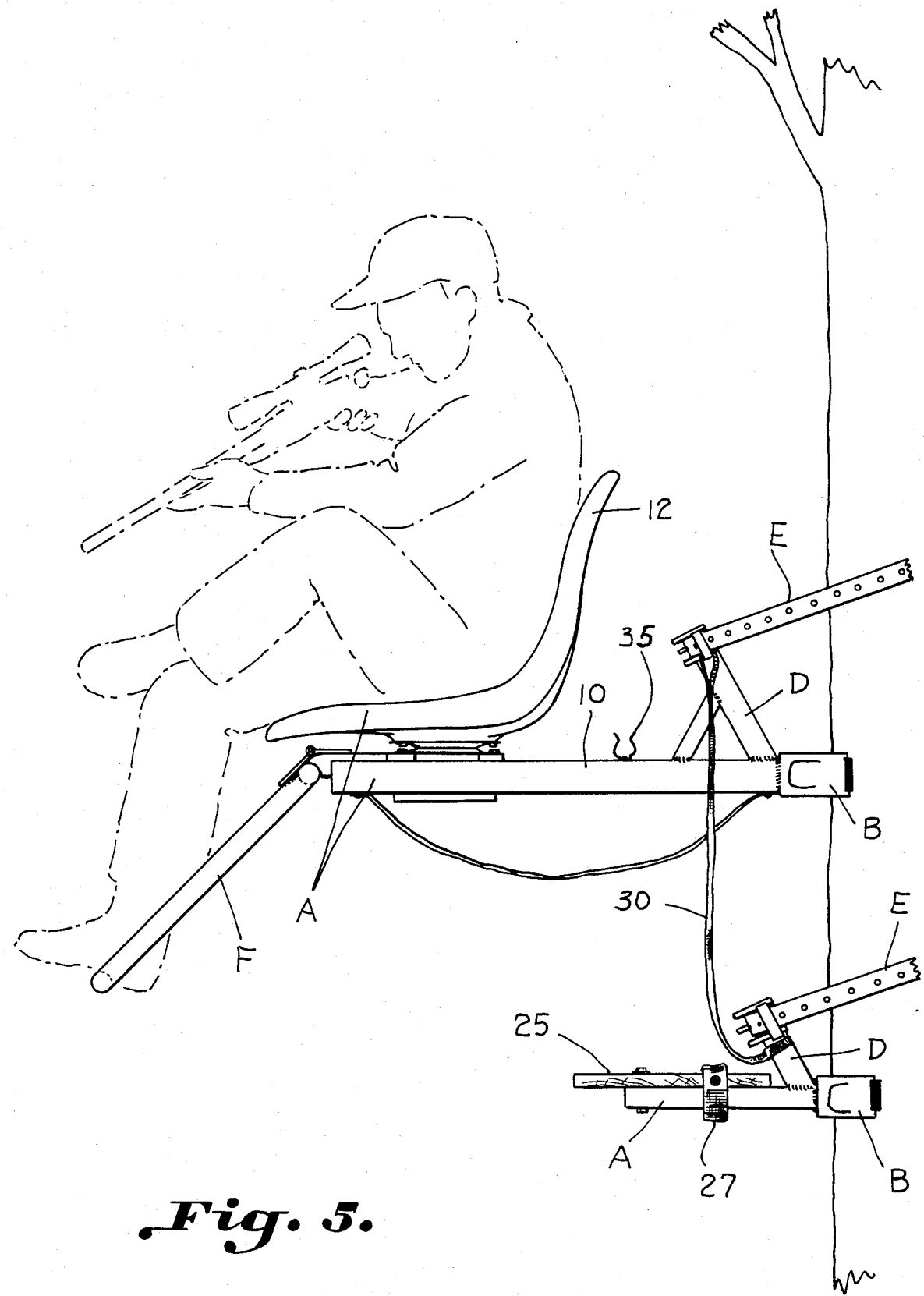
FIG. 5 is a perspective view illustrating the user as being a hunter sitting with the seat in swiveled rearward position with the seat supported.

Referring now especially to FIG. 2, it will be noted that a support member for the flat steel strap E includes an arcuate drum 18 which has upper and lower flanges 19 and 20, respectively, providing an arcuate surface for accommodating one or more loops of the steel strapping. It is important to note that spaced retaining members 21 and 22 are carried by the lower flange providing an opening at the top for receiving the steel strapping for connection by passing a stud 23 carried by the support member 18 and extending outwardly between the upper and lower flanges 19 and 20 and between the retaining members 21 and 22 for passing through an opening in the strapping fixing same in an upwardly inclined position and in diverging relationship with the body support member A.

Referring now particularly to the body support member of FIG. 2, a foot support portion 25 is connected by suitable fastening bolts 26 to the body support bar 27.

Straps having suitable loops 28 are provided for engagement by the feet of the user.

The steel straps E are provided with a plurality of spaced openings therein for conveniently accommodating the tree. In order to provide an additional strap means for connecting the upper and lower parts together and for facilitating backpacking as illustrated in FIG. 6, a flexible strap 30 may be provided and is illustrated as having suitable loop attachment with each of the upper and lower units.

The foot rest portion F is connected as by a hinge 31 (FIG. 1) to the rearward portion of the body support bar 10. The bar has a stop 32 for engaging a rearward surface 33 of the bar. The foot support is substantially rectangular providing an outwardly extending U-shaped portion for engaging the seat that is preferably constructed of tubular members.

Figure 6:
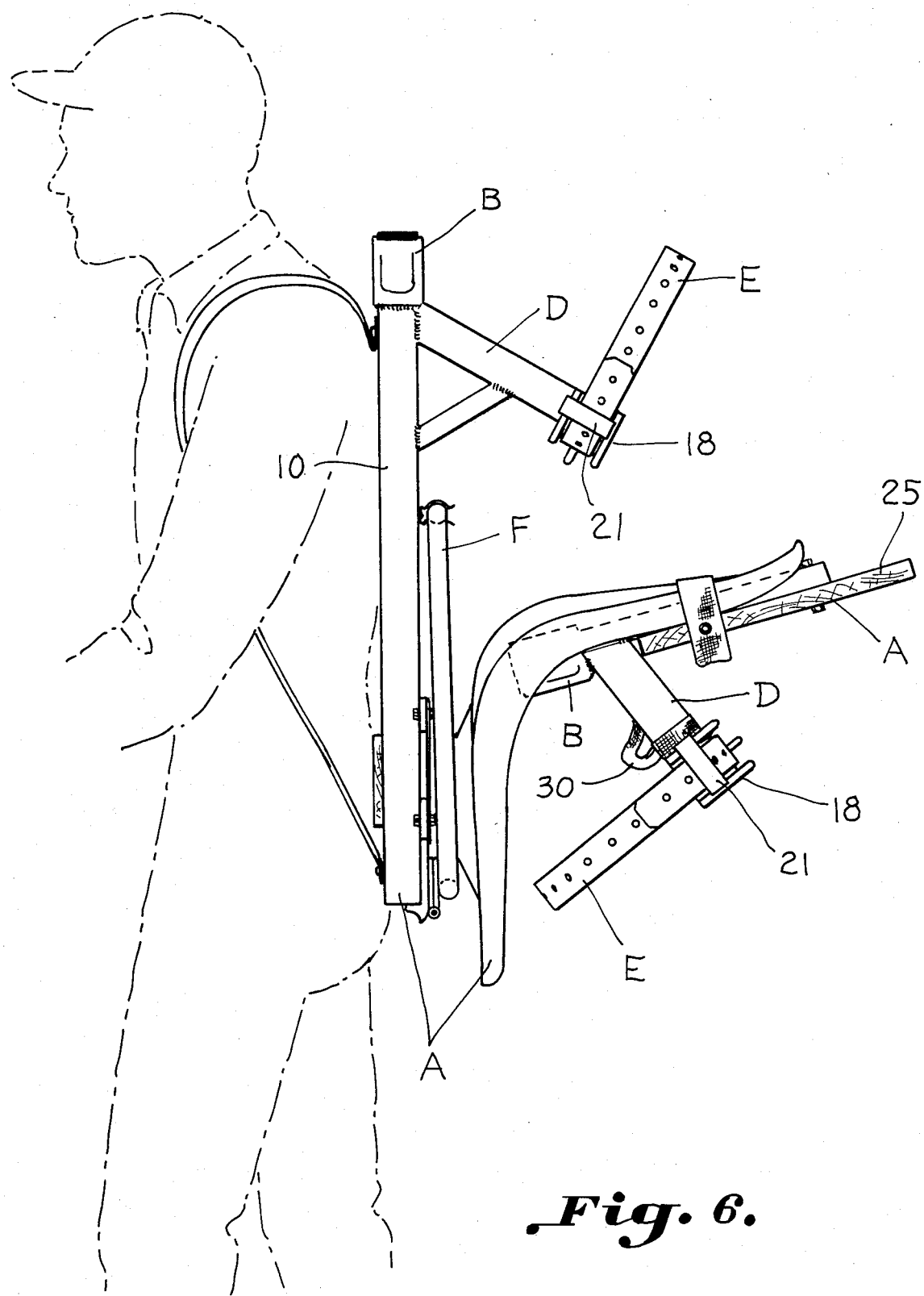
FIG. 6 is a side elevation illustrating a pair of units constructed in accordance with the present invention assembled in backpack position.

FIG. 6 shows the two-part apparatus secured for backpacking with the U-shaped portion of the foot support engaged and in the spring clip 35 in retracted position. The foot rest is folded into the retaining clip. The steel band is looped in two or three coils around the strap supports. The bottom of the foot unit or apparatus is placed on the back inside of the seat with the rubber contact pads turned toward the seat bottom. The fabric strap is opened to allow the back of the seat to pass through before again securing the strap.

In order to secure the seat the first apparatus is placed against the desired tree with the rubber contact pads turned upward. Then the steel band is placed around the tree and the seat raised up to allow the band to pass down and through the first retaining clip. The seat bar or support is adjusted to an elevated position with the upright or standard being slightly less than vertical, depending on the taper of the tree. The steel band or strap is placed over the stud in the hole desired. The band is passed through the second retaining clip through the open space provided at the top of the clips. Loose ends of the steel strap are secured by folding back and passing them through the retaining clips again. The foot unit is likewise attached below the seat apparatus. The safety belt on the foot unit is secured to one of the retaining clips on the seat unit and remains attached at all times.

In order to climb, it is preferable to step on the center outside of the foot unit to mount the seat astride the seat bar. The weight on the foot unit should be on the outside away from the tree. The feet are then placed in the lift belts of the foot unit. The steel band should be at approximately a right angle from the upright bar at all times. The user then stands up with the left hand on the left side of the belt support head on the seat unit and the right hand on the seat. The seat is then lifted higher than the head allowing the steel band to stand out around the tree and the seat unit is moved up the tree. The user then sits down and lifts the foot unit up the tree to a comfortable position where standing again. This action is continued until the desired height is achieved. When the desired height is reached, the foot unit is raised to suitable height for serving as an additional foot rest and secured in position by wrapping the safety belt around the headpiece of the seat unit. The foot rest is not to be used as a step. To climb down the procedure is reversed. If a tree tapers to a marked degree and a very high position is desired, it may be necessary to adjust the seat and foot unit for a more comfortable position. The user should place his weight on the first or second apparatus which is not being adjusted and move the steel band to the desired setting.

While a preferred embodiment of the invention has been described using specific terms, such description is for illustrative purposes only, and it is to be understood that changes and variations may be made without departing from the spirit or scope of the following claims.

What is claimed is:

1. Apparatus for climbing trees and the like comprising:
    an elongated body support member extending laterally outwardly from a tree;
    a headpiece carried on one end of said body support member having means engaging said tree;
    a standard carried by said body support member adjacent said headpiece extending upwardly and outwardly from said tree at an obtuse angle with said body support member;
    a flat flexible steel band carried adjacent an upper end of said standard encompassing said tree; and
    support means for carrying said strap fixed to said standard for securing said strap in diverging relation to said headpiece at approximately a right angle to said standard;
    whereby said headpiece is wedged inwardly into engagement with said tree.

2. The structure set forth in claim 1, wherein said support means further includes spaced upper and lower flanges accommodating said flat steel band therebetween.

* * * * *